Nov. 16, 1926.

H. WEICHSEL 1,607,030

DYNAMO ELECTRIC MACHINE

Filed March 26, 1925    2 Sheets-Sheet 1

INVENTOR
Hans Weichsel
BY
ATTORNEY

Nov. 16, 1926.  
H. WEICHSEL  
1,607,030  
DYNAMO ELECTRIC MACHINE  
Filed March 26, 1925   2 Sheets-Sheet 2
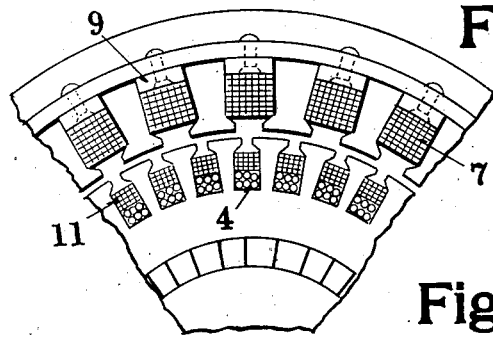
Fig.3.
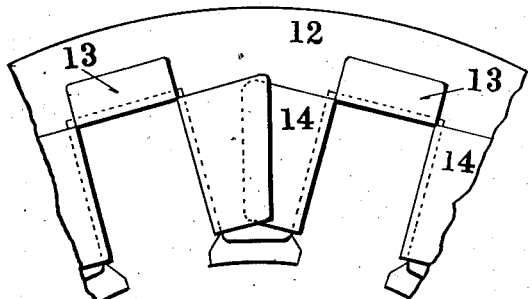
Fig.4.
Fig.5.
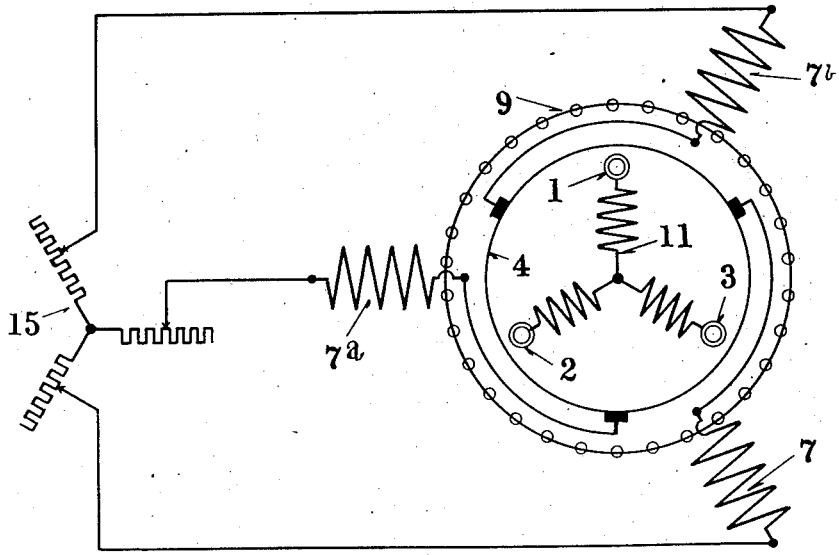
INVENTOR  
Hans Weichsel  
BY E.E.Huffman  
ATTORNEY Patented Nov. 16, 1926.

1,607,030

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

DYNAMO-ELECTRIC MACHINE.

Application filed March 26, 1925. Serial No. 18,386.

My invention relates to dynamo electric machines and particularly to self-excited synchronous motors, compensated asynchronous motors, and converters, whether of the polyphase or single phase type.

In a co-pending application, Serial No. 713,421, I have described a self-excited synchronous motor so constructed as to have, even in large sizes, a sufficiently low exciting voltage to secure satisfactory commutation during starting. Speaking generally I achieve the desired result in the motor described in the aforesaid application, by causing the commuted winding to embrace a part only of the rotor laminations, the inducing winding on the rotor embracing all of the rotor laminations and the exciting winding on the stator embracing all of the stator laminations.

My present invention constitutes an improvement in machines of the type just described, its object being to further improve the commutation, particularly in large machines.

In motors of the type herein referred to, there exists not merely a single field stationary in space at synchronism, but also harmonic fields which rotate with respect to the stationary member, these harmonic fields being due to the fact that a true sine shape distribution of an alternating current field is impossible of attainment. These harmonic fields induce voltages in the coils of the commuted winding at the time they are undergoing commutation and therefore tend to produce sparking at the brushes. In accordance with my invention I overcome the effect of these harmonic fields upon commutation by applying to the portion of the stator laminations opposite the portion of the rotor laminations embraced by the commuted winding, a closed-circuit winding, preferably of the squirrel-cage type, which serves to destroy or so reduce the harmonic fields referred to, as to prevent sparking resulting from their interaction with the coils of the commuted winding.

My invention also comprises the novel structure of the short-circuited winding and its relation to the exciting winding on the stator which is hereinafter described.

Figure 1:
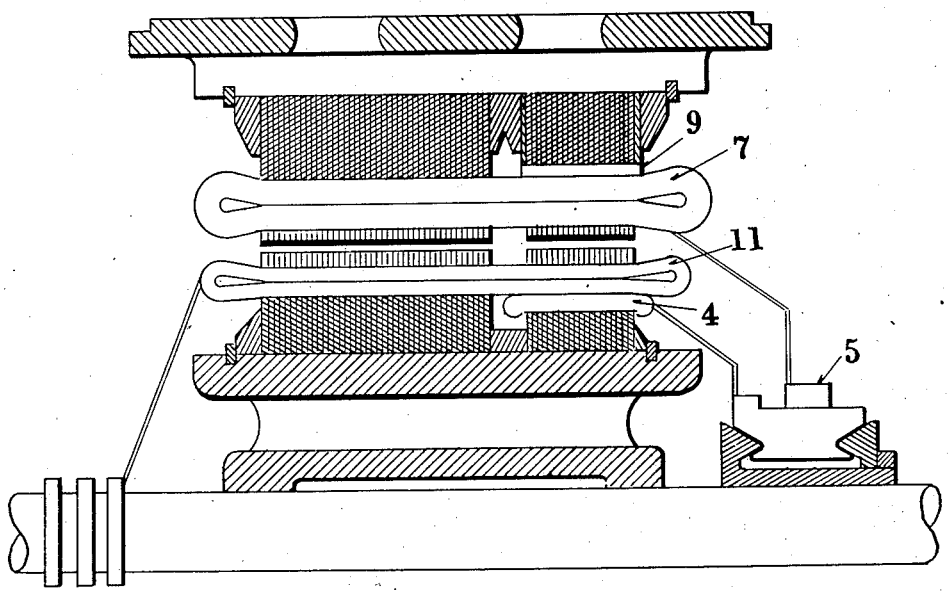
Figure 2:
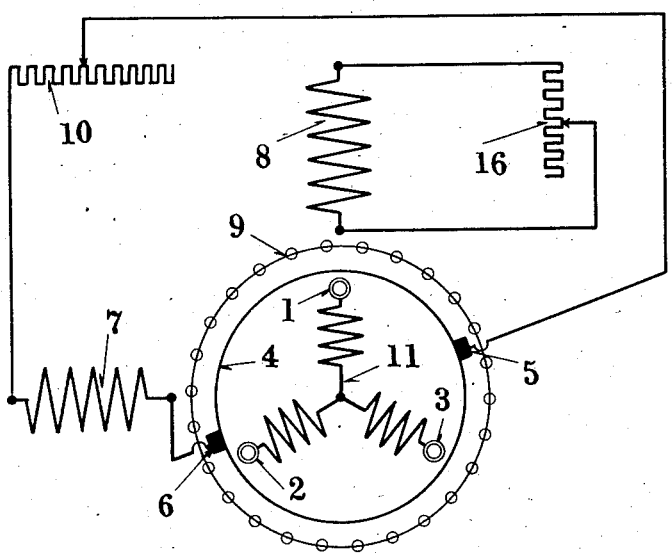

In the accompanying drawings Figure 1 is a view partly in section and partly diagrammatic of a motor embodying my invention; Figure 2 is a diagrammatic view showing the circuit connections of the motor of Figure 1; Figure 3 is a view of a portion of the rotor and stator laminæ of Figure 1, showing the arrangement and location of the windings; Figure 4 illustrates a modified form of the squirrel-cage winding of Figures 1 and 3; and Figure 5 diagrammatically illustrates the windings and circuits which would be employed on a stator and rotor construction of the kind shown in Figure 1 to form a compensated asynchronous motor embodying my invention.

Referring to Figures 1 to 3, inclusive, the rotor is provided with polyphase winding 11 supplied with line current through the slip rings 1, 2, 3, and with a commuted winding 4 which, through brushes 5, 6, supplies E. M. F. to the exciting winding 7 on the stator. In the machine illustrated the stator is the induced member and is also preferably provided with a starting winding 8 displaced from the exciting winding 7.

The commuted winding 4 embraces a part only of the rotor laminations as shown, and the stator is provided with a closed circuit winding 9 embracing the part only of the stator laminations which is located opposite the part of the rotor laminations embraced by the commuted winding 4. Windings 11 and 7 embrace all of the rotor and stator laminations respectively.

Referring to the operation of the machine described, line current is supplied through the slip rings, and to start the machine adjustable resistance 10 is included in the circuit of the exciting winding 7 and adjustable resistance 16 in circuit with the starting winding 8. In normal operation resistances 16 and 10 may be cut out and winding 8 may be open circuited. However, in a machine designed to operate as a synchronous motor, it is preferable that this winding 8 be short-circuited during normal running condition, in order that the machine may continue to operate satisfactorily as an induction motor if the load should increase sufficiently to pull it out of synchronism.

As hereinabove indicated, the winding 9 on the stator, which is preferably a squirrel-cage winding, serves to damp out the harmonic fields which would otherwise induce voltages in the coils of the commuted winding 4 at the time they are short-circuited by the brushes and thus eliminate this cause of sparking. Since the squirrel-cage winding 9 embraces only a relatively small part of the stator laminations, it does not substantially diminish the starting torque of the machine.

While the conventional form of squirrel-cage shown in Figure 3 is suitable for the winding 9, I prefer the novel construction of this winding illustrated in Figure 4, in which the squirrel-cage conductors are in the form of relatively thin sheets of copper bent into trough shape, as shown, and forming a lining of the stator slots. The conductors of the winding 7 in the slots are thus embraced by the conductors of the squirrel-cage winding. The end rings for the squirrel-cage winding described are copper punchings 12, which may substantially conform to the stator laminæ and are clamped with said laminæ. Portions of the squirrel-cage conductors extend beyond the laminæ and have their bottom and side walls bent over against the outer face of the end ring or sheet 12 and soldered thereto, as indicated in Figure 4, where the lip formed by the bottom wall is indicated by the numeral 13, and those formed by the side walls by the numeral 14. This novel form of squirrel-cage winding has the advantage that both windings are in good inductive relation with the inducing member, and the further advantage of permitting the use of end rings of very small dimension in the direction of the axis of the machine.

The machine of Figure 5 is similar to the machine hereinabove described with respect to the action of the closed circuited winding 9 in improving commutation. The machine differs from the machine of Figure 2 in that the stator is provided with a three-phase exciting winding 7, 7ª and 7ᵇ in circuit with the commuted winding through a three-phase arrangement of brushes thereby having impressed thereon, during normal operation, low frequency alternating voltage corresponding to the frequency of the induced voltage and of proper phase relation to the induced voltage to obtain the desired power factor. The current through the stator windings is controlled by the adjustable resistance 15.

Having fully described my invention, what I claim as new and desire to secure by Letters Patent of the United States is:

1. In an alternating current motor, the combination of an induced member and an inducing member provided with an inducing winding and with a commuted winding, said commuted winding longitudinally embracing a smaller portion of the laminations of the inducing member than embraced by the inducing winding, and a closed circuited winding embracing a portion only of the laminations of the induced member and located opposite the portion of the inducing member embraced by the commuted winding.

2. In an alternating current motor, the combination of an induced member provided with an exciting winding and an inducing member provided with an inducing winding and with a commuted winding in circuit with the exciting winding, said commuted winding longitudinally embracing a smaller portion of the laminations of the inducing member than embraced by the inducing winding, and a squirrel-cage winding embracing a portion only of the laminations of the induced member and located opposite the portion of the inducing member embraced by the commuted winding.

3. In an alternating current motor, the combination of an induced member provided with an exciting winding embracing all of its laminations, an inducing member provided with an inducing winding and with a commuted winding in circuit with the exciting winding, the inducing winding embracing all the laminations of the inducing member and the commuted winding embracing a small portion only of said laminations, and a squirrel-cage winding on the induced member, said winding embracing that portion only of the laminations of the induced member which are located opposite the portion of the inducing member embraced by the commuted winding.

4. A dynamo electric machine having one of its members provided with winding slots containing conductors of two windings, one of which is a squirrel-cage winding whose conductors are formed of sheet material positioned adjacent to the lateral walls of the slots, the end conductors of said squirrel-cage being formed of sheet material provided with openings through which the conductors extend, the extensions of said conductors being bent over upon the said end conductors and conductively united therewith.

In testimony whereof, I have hereunto set my hand this 23d day of March, 1925.

HANS WEICHSEL.